United States Patent [19]

Führer et al.

[11] 4,449,691
[45] May 22, 1984

[54] ELECTROMAGNET

[76] Inventors: Egon Führer, 35, Hopfenstrasse; Dieter Kleinert, 9, Nelkenweg; Gerd Pfrogner, 20, Dresdener Strasse, all of D 8940 Memmingen; Max Egg, 28, Gartenstrasse, D 8941 Erkheim, all of Fed. Rep. of Germany

[21] Appl. No.: 332,836

[22] Filed: Dec. 21, 1981

[30] Foreign Application Priority Data

Aug. 17, 1981 [DE] Fed. Rep. of Germany ....... 3132396

[51] Int. Cl.$^3$ ................ F16K 25/00; F16K 31/02
[52] U.S. Cl. ..................... 251/85; 251/129; 335/257; 335/258
[58] Field of Search ............. 310/30, 23; 335/257, 335/258, 255, 262; 251/129, 141, 64, 282, 138, 83, 80, 79, 85; 137/DIG. 5; 92/85 R

[56] References Cited

U.S. PATENT DOCUMENTS

| | | | |
|---|---|---|---|
| 1,837,197 | 12/1931 | Berman | 310/30 |
| 2,296,132 | 9/1942 | Wiseley | 251/80 |
| 3,303,445 | 2/1967 | Flentge | 335/255 |
| 3,446,473 | 5/1969 | Barker | 251/64 |
| 3,534,772 | 10/1970 | Stampfli | 251/85 X |
| 4,195,662 | 4/1980 | Göttel | 251/138 |
| 4,364,541 | 12/1982 | Chabat-Courrède et al. | 251/83 |

FOREIGN PATENT DOCUMENTS

| | | | |
|---|---|---|---|
| 2712669 | 9/1978 | Fed. Rep. of Germany | 92/85 R |
| 45-31222 | 8/1970 | Japan | 341/251 |

*Primary Examiner*—Martin P. Schwadron
*Assistant Examiner*—Stephen M. Hepperle
*Attorney, Agent, or Firm*—Holman & Stern

[57] ABSTRACT

An electromagnet used to operate a valve comprises an armature guided in a coil carrying body and equipped with an annular flange projecting into a recess in a buffer body with opposed limit faces to brake the movement of the armature in one direction before abutment of the pole faces and in the other direction a sealing of the valve opening. In the latter braking action the armature does not impact against the sealing surface due to a spring abutment of the valve member against the armature. The new electromagnet achieves a comparatively high degree of switch operation frequencies.

7 Claims, 2 Drawing Figures

1

ELECTROMAGNET

BACKGROUND OF THE INVENTION

1. Field of the Invention

This invention relates to an electromagnet, and in particular an electromagnet for operating a valve of the type comprising an armature which is movable between two limit positions and moves an object, for example the valve member, a core against which the armature moves when the coil is energised, the armature being guided by the body of the coil, and a spring for returning the armature.

2. Description of the Prior Art

Electromagnets of the kind described are used for example, although not exclusively, for operating a valve, such as a hydraulic or pneumatic valve.

The electromagnet can be incorporated with the valve in a structural unit, but it is possible to arrange the magnet separately and to operate the valve through some suitable element.

It is desirable in many cases in using an electromagnet of this kind to be able to achieve high frequence switching rates, for example rates of up to 9-digit numbers are necessary.

It is known to increase the effective life of a magnet by enclosing it movably in a guide tube of plastics material, in which case the guide tube may preferably serve simultaneously as a coil-carrying body. A further means for increasing the useful life lies in controlling the limits to the travel of the armature so as to keep mechanical strains on the latter as small as possible. Thus should the armature impact hard against the means limiting it there will sooner or later be some deformation of the impacting face of this armature and the formation of cracks is possible. The guide surfaces, particularly those of the armature guide tube, become damaged and this frequently is a cause of a reduced life.

It is known to use buffer means which dampens the impact of the armature more particularly on the pole face of the core. Resilient buffer discs and similar means have been used for this purpose. The introduction of such means is however difficult because frequently the air gaps which reduce the magnetic forces are increased thereby. To maintain the magnetic forces it is then necessary to increase the dimensions of the magnet, which means extra expense and drawbacks.

A corresponding increase in the dimensions means an enlargement of the mass of the armature which reduces the speed of travel of the armature and further increases the bulk of the armature to be dampened.

If the resilient buffer members are made comparatively small their effect is likewise small and the dampening means are thus overloaded and become prematurely worn.

BRIEF SUMMARY OF THE INVENTION

It is an object of the present invention to provide an electromagnet which can be used where high frequency switching rates prevail. To meet this object the invention provides an electromagnet of the kind first set forth above and proposes the provision on the armature of an outwardly directed flange which projects into a recess in the buffer body and this body is provided in the recess with two opposed surfaces which define the limits of the armature stroke.

Using the invention, the mass of the armature is only slightly increased. Moreover, this provides an element on the armature which is suited very well to the use of suitable dempening or buffer means, and in particular a buffer body. The flux of the magnetic lines of force is not significantly varied by this flange and it is possible to use a buffer body of the same comparative dimensions. The flange and the buffer body are used to dampen the movements in both directions and this simplifies construction thereof.

The buffer means in the buffer body can be special covering or incorporated bodies. It is better however to make the buffer body itself as a whole from a resilient material which means a comparatively simple construction.

Particularly when the armature is made as a rotational body, it is advisable to make the flange or annular form which then can be surrounded on all sides by a deformable buffer body material. The assembly can then be made by appropriate widening of the resilient buffer body so that it can be slipped over the annular flange. Other forms of construction are however usable, for example a form in which the flange is made up of parts assembled on the armature.

In general, beyond the magnetic forces, restoration factors are imposed by a return spring on the armature. The armature can then be applied against the return spring. It has been found that this form of construction can be a reason for premature wear which can occur between the metallic return spring and the armature. To prevent this, it is further proposed in this invention for the return spring to bear through a presser body of plastic material against the armature and the core or the like respectively. The presser body can, for example, be made of a polyamide. The return spring and the presser bodies are preferably arranged in a recess in the armature.

It is proposed in accordance with a further feature of the invention to hold the valve-closure member in a recess in the armature. This simplifies construction and avoids the need for additional fastening means. In particular instances the closure member can bear against the armature through a spring, which also achieves a resilient mounting of the armature during valve closure movement and militates against premature damage to the closure body. It has been found useful for the sealing surface of the valve to be surrounded with a non-sealing abutment surface for the valve element. During the closure movement of the valve there is thus an adequate area of surface to ensure only a small surface contact and thus a high closure frequency rate. Despite this the actual sealing surface is comparatively small so that the resistance to the movement of the valve member during valve opening is not greatly increased.

BRIEF DESCRIPTION OF DRAWINGS

The invention will now be described in greater detail with reference to the accompanying drawings wherein.

DETAILED DESCRIPTION

Figure 1:
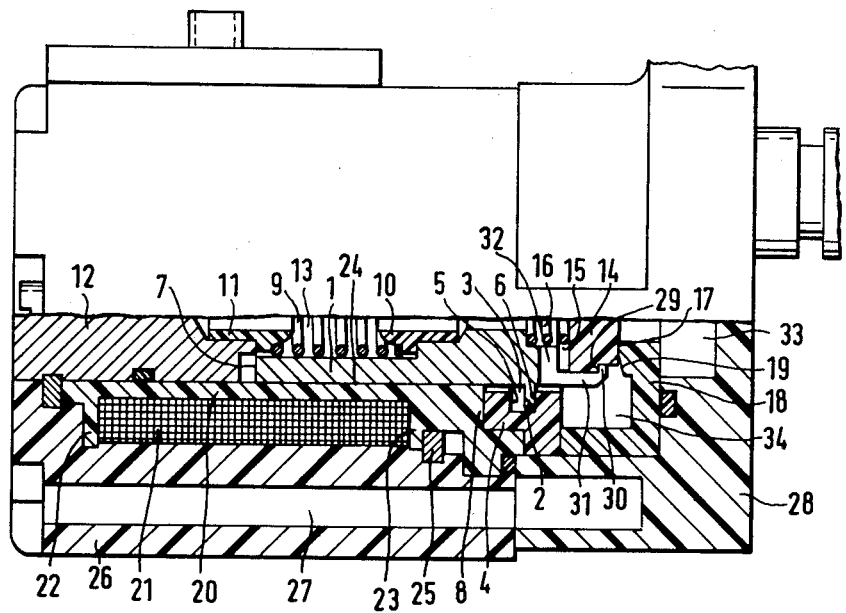
FIG. 1 is a diagrammatic part cross-sectional view of an embodiment of the invention.
Figure 2:
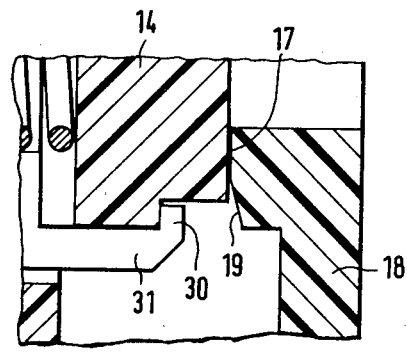
FIG. 2 is an enlarged cross-sectional view of a detail of FIG. 1.

In the embodiment illustrated the electromagnet is combined in one unit with the valve. The electromagnet primarily comprises a coil support body 20 carrying the coil which takes the form of a winding 21 and is arranged between the flanges 22 and 23 of the coil support body 20.

The surface 24 of the coil support body is used to guide the armature 1 and may be provided with longitudinal grooves to absorb any friction so occasioned. The core 12 likewise projects over the surface 24 of the body 20. The magnetic flux is increased by a clip which is not fully illustrated in the drawing but a part 25 of which can be seen. All the essential parts of the electromagnet are enclosed by a moulded jacket 26 are armature screws (not shown) are arranged in holes 27 to connect the electromagnet to the valve housing 28.

The armature 1 has a recess 13 in which like presser bodies 10 and 11 are arranged with the return spring 9 between them. The presser bodies 10 are thereby arranged in the armature 1. The pole face of the armature opposite the core 12 is designated 7.

The armature 1 is provided with a flange 2 of annular form which projects into the recess 3 in a buffer body 4. The two flanges on buffer body 4 defining the recess 3 at the ends of the armature movement are designated 5 and 6.

It is important for the buffer body 4 to be arranged at the end 8 of the coil support body 20. This allows space for the insertion of the flange 2 and the buffer body 4 without having to significantly increase the outer dimensions of the electromagnet.

When the coil 21 is energized the armature 1 and its pole face 7 will approach the corresponding pole face of the core 12. The flange 5 of the buffer body is so arranged that the flange 2 runs against the flange 5 and the armature comes to rest before the pole 7 strikes the core 12. When the coil is de-energized the spring 9 pushes the armature back. Arranged at the end of the armature 1 opposite to the pole face 7 is the closure member 14 of the valve. This valve member is stepped at 29 where it co-acts with an inwardly directed flange 30 of the armature 1. The assembly is made possible by virtue of the elastic deformability of the element 14 which is made of an appropriate material for this purpose. Spring 16 extends between the valve member 14 in the recess 15 and the armature 1.

A transverse groove 32 divides the flange 30 are also the tubular extension 31 on the armature 1 carrying the flange 30 into two parts and primarily allows the flow of the medium into or out of the recess in order to prevent any undesirable dampening during the movement of the valve member 14 relatively to the armature 1.

In the closed position the valve member 14 is applied against the sealing surface 17 of the valve insert 18. The annular sealing surface is surrounded by the abutment surface 19 which is provided by an appropriate conical formation of the valve insert in this area.

During the closure movement of the valve under the action of the return spring 9 the closure element 14 comes into contact with the sealing surface 17. The abutment surface 19 on the valve element 18 provides a large contact surface for supporting the closure element and also the force initiated by the spring 16 is made available to the armature 1.

The flange 2 is so disposed relatively to the flange 6 as to absorb the energy of movement of the armature 1 predominantly by the buffer 4. When the closure phase is ended the valve body 14 bears only against the sealing surface 17 so that only a minor opening effort has to be exerted thereon when the coil 21 is energized.

The valve, primarily composed of the valve closure body 14 and the valve seat 17, 19 of valve insert 18 alternately opens and closes the connection between the two valve chambers 33 and 34 illustrated. The conduits leading to these valve chambers have not been shown in the drawing.

We claim:

1. In an electromagnet comprising a core, a coil mounted on a coil body adjacent said core, an armature guide in said coil body and movable against said core in response to energization of said coil, and a spring for returning said armature on de-energization of said coil, the improvement comprising a buffer body of resilient material mounted on said coil body adjacent said armature, a recess in said buffer body having opposed end walls and an outwardly-extending annular flange on said armature and surrounding said armature projecting into said recess in the buffer body so that said flange is substantially fully enclosed within said buffer body and alternately abuts said opposed end walls of the recess to determine and dampen the stroke of the armature.

2. An electromagnet according to claim 1, wherein the buffer body is disposed at one end of the coil body.

3. An electromagnet according to claim 1 wherein the return spring is mounted on the armature, and further comprising presser members of plastics material respectively supported on the armature and the core and engaging the opposite ends of said return spring so that the force of said return spring is applied to said core and armature through said presser members.

4. An electromagnet according to claim 3, and further comprising a recess in said armature and said return spring and presser members are disposed in said recess in the armature.

5. An electromagnet according to claim 1 wherein the electromagnet is operatively associated with a fluid valve having a valve seat and a movable valve closure member, and further comprising a valve recess in the end of said armature, said valve closure member being engaged within said valve recess so that it is operated by said armature between open and closed positions.

6. An electromagnet according to claim 5, wherein a spring is provided between said valve closure member and said armature to resiliently urge said valve closure member axially outwardly with respect to said armature.

7. An electromagnet according to claim 6, wherein the valve closure member has a sealing surface cooperating with a non-sealing abutment surface of the said valve seat receiving said closure member.

* * * * *